United States Patent [19]

Kawada et al.

[11] 4,268,781

[45] May 19, 1981

[54] DC MOTOR DRIVE SYSTEM

[75] Inventors: Shigeki Kawada, Hino; Shigeaki Oyama, Hachioji; Yoshiki Fujioka, Hino; Mitsuhiko Hirota, Setagaya; Toyohiko Nishimori, Hachioji, all of Japan

[73] Assignee: Fujitsu Fanuc Limited, Japan

[21] Appl. No.: 850,793

[22] Filed: Nov. 11, 1977

[30] Foreign Application Priority Data

Nov. 15, 1976 [JP] Japan .................................. 51-137144

[51] Int. Cl.³ .............................................. H02P 5/16
[52] U.S. Cl. .................................... 318/434; 318/332; 318/432
[58] Field of Search ............... 318/447, 434, 432, 433, 318/338, 332, 308, 326, 327, 439; 261/24, 30, 31, 33

[56] References Cited

U.S. PATENT DOCUMENTS

| | | | |
|---|---|---|---|
| 3,421,065 | 1/1969 | Stabile | 318/338 |
| 3,515,971 | 6/1970 | Joslyn et al. | 318/308 |
| 3,716,772 | 2/1973 | Larson | 318/332 |
| 3,735,226 | 5/1973 | Pittner | 318/432 |
| 3,887,855 | 6/1975 | Klimo | 318/433 |
| 3,950,684 | 4/1976 | Peterson | 318/338 |

Primary Examiner—David Smith, Jr.
Attorney, Agent, or Firm—Staas & Halsey

[57] ABSTRACT

An actual speed N of a DC motor and an armature current Ia are detected to detect the motor output $N \times Ia$. The motor speed is changed so that the detected motor output may not exceed a predetermined value. The spark generation of the motor brush is prevented when an over load is applied to the motor.

7 Claims, 6 Drawing Figures

DC MOTOR DRIVE SYSTEM

BACKGROUND OF THE INVENTION

This invention relates to a DC motor drive system, and more particularly to a DC motor drive system which is adapted to prevent spark generation of the brush portion resulting from an increase in a load and which is of particular utility when employed for driving a DC motor of the type using a permanent magent.

In a DC motor, when the motor output exceeds a certain value with an increase in a load, the brush portion produces sparking. The spark generation of the brush decreases the lifetime of the motor and in its turn leads to breakage of the motor.

It is one object of this invention to provide a DC motor drive system which controls the motor speed so that the motor output may not exceed a predetermined value.

It is another object of this invention to provide a DC motor drive system which controls the motor speed to hold the motor output less than a predetermined value, preventing spark generation of the brush portion for the protection of the motor.

The above objects are achieved by providing a DC motor drive system which has means for detecting the power of a DC motor and feedback means for changing the motor speed in response to the detected power and wherein the motor speed is changed so that the power does not exceed the allowed value of the motor.

DESCRIPTION OF THE PREFERRED EMBODIMENTS

Figure 1:
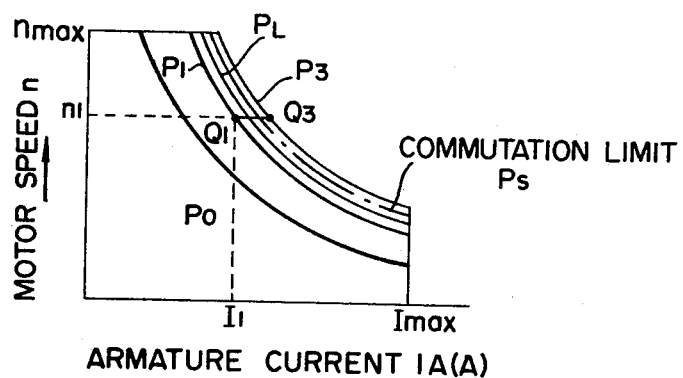
FIG. 1 is a graph showing the output characteristics of a DC motor.

In a DC motor, letting its output power, revolving speed, armature current, field flux and load torque be represented by $P_O$, n, $I_a$, $\phi$ and T, respectively, the following formula is formed.

$$P_O = 2\pi n \cdot T \quad \ldots (1)$$

$$T = k \cdot \phi I_a \quad \ldots (2)$$

where k is a constant. From the formulae (1) and (2), it follows that $$P_O = 2\pi \cdot k \cdot \phi \cdot n \cdot I_a \quad \ldots (3)$$

In a DC motor of the type generating the field flux by the use of a permanent magent, the field flux $\phi$ is constant and the following formula is established.

$$P_O = K \cdot n \cdot I_a \quad \ldots (4)$$

where $K = 2\pi k \phi$.

Accordingly, as long as the load is constant, that is, as long as the DC motor output $P_O$ is constant, the revolving speed and the armature current are in inverse proportion to each other, providing such a characteristic as indicated by the curve $P_O$ in FIG. 1.

By the way, in the DC motor, the commutation limit curve of the brush portion is such as indicated by the curve $P_3$ in FIG. 1. Accordingly, the use of the DC motor in the region exceeding the commutation limit curve $P_3$ will produce sparking of the brush and quicken wear of the brush.

For example, in the case of a lathe, the depth of cut and the spindle revolving speed to be instructed are determined in consideration of a permissible torque of the cutter, the material of the workpiece, the cutting efficiency, etc., and the motor speed is controlled to match with the instructed spindle speed. Let it be assumed that a DC motor for driving the spindle is revolving for cutting at an operation point $Q_1$ on the power curve $P_1$ in FIG. 1 where the instructed speed is $n_1$ and the armature current is $I_1$. When the cutter reaches a harder portion of the workpiece as the cutting proceeds, the torque on the cutter suddenly increases to lower the motor speed. Then, the difference voltage between the instructed motor speed and the actual speed rises to control the motor speed so as to keep it constant. In this instance, the armature current Ia increases with an increase in the difference voltage and the motor output increases from $P_O$ to $P_3$ in excess of the commutation limit $P_s$. In other words, the operation point passes the commutation limit curve to reach the point $Q_3$ on the curve $P_3$. As described above, however, sparking occurs to degrade the characteristic of the brush and cause its rapid wear.

The spark generation could be avoided by such a control that immediately when the operation point oversteps the commutation limit, the revolving speed of the DC motor decreases to reduce the time in which the operation point stays above the commutation limit.

The abovesaid commutation limit curve $P_3$ can be considered qualitatively as follows: The more the armature current increases, the more remarked the demagnitizing effect becomes and the neutral axis of the DC motor shifts. As a result of this, the winding short-circuited by the brush crosses the field flux to produce a counter electromotive force in the winding causing the flow therethrough of a large local current, generating sparking of the brush.

On the other hand, as the motor speed increases, the current variation time in the winding in which the direction of the current changes, becomes short to produce a large counter electromotive force ($e = L(di/dt)$) in the winding, facilitating the spark generation of the brush.

In view of the above, for preventing sparking and wear of the brush, it is desirable to set a power limit curve $P_L$ and control the DC motor within the limit of the power limit curve $P_L$. In this case, it is undesirable to coincide the power limit curve $P_L$ with the commutation limit curve $P_3$, because there are some occasions when the operation point exceeds the curve $P_3$.

Accordingly, this invention is intended to provide a DC motor drive system which ensures the motor operation within the limit of the abovesaid commutation limit curve.

Now, this invention will be described in detail.

Figure 2:
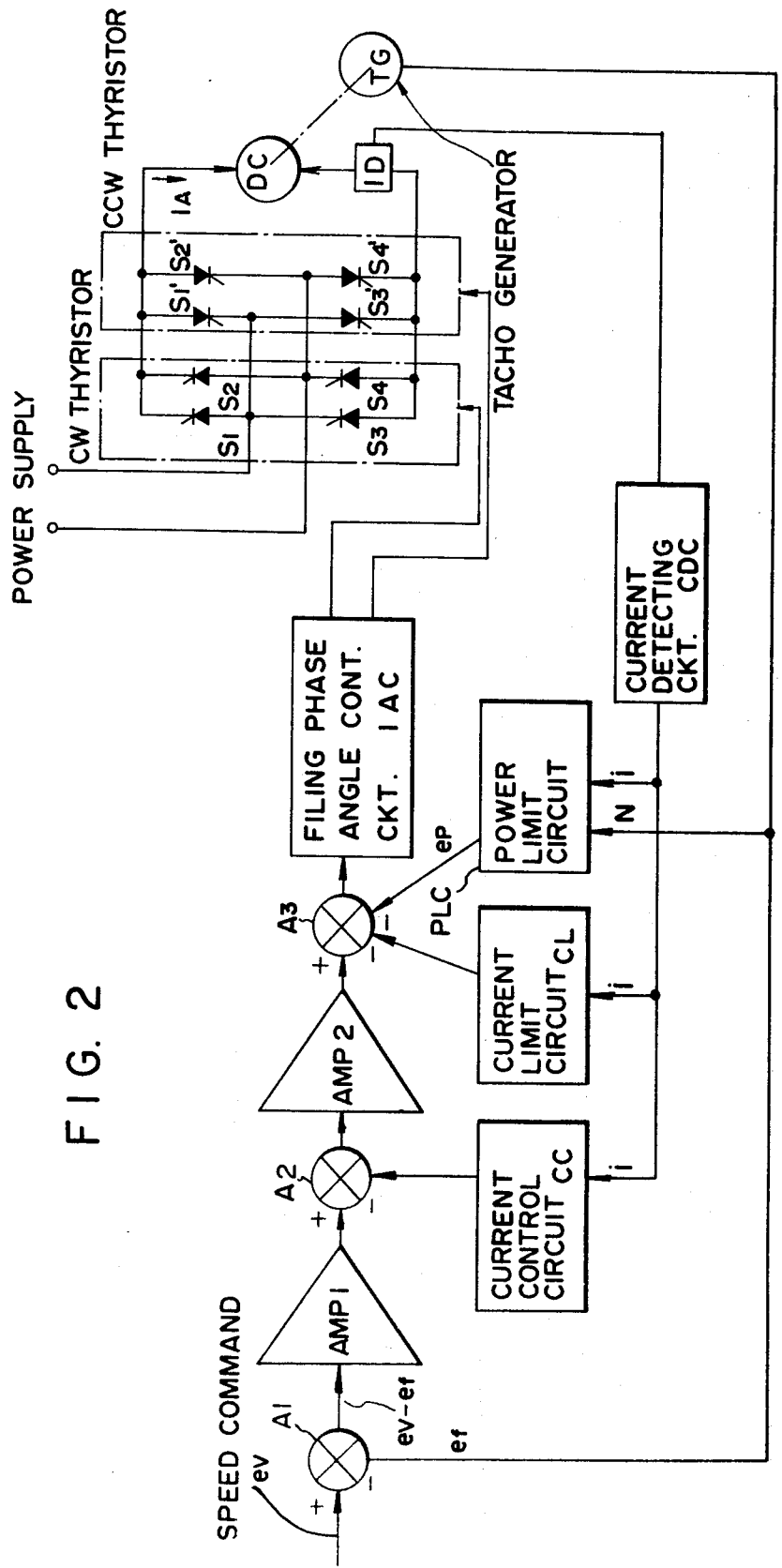
FIG. 2 is a block diagram illustrating a DC motor drive circuit embodying this invention.

FIG. 2 shows in block form a DC motor control circuit embodying this invention. In FIG. 2, reference character DC indicates a DC motor; TG designates a tacho generator for generating a voltage proportional to the revolving speed of the DC motor; $S_1$ and $S_4$ identify clockwise thyristors; $S_1'$ to $S_4'$ denote counter clockwise thyristors; ID represents an armature current detector formed, for instance, with a resistor; IAC shows a firing phase angle control circuit for controlling the firing phase angles of the abovesaid thyristors; CDC refers to a current detecting circuit supplied with the output from the armature current detector ID to detect a current value; $A_1$ to $A_3$ indicate adders; AMP1 and AMP2 designate amplifiers; CC identifies a known current control circuit for the feedback of the armature current; CL denotes a known current limit circuit which operates to prevent the armature current from exceeding a predetermined maximum value and provides an output when the armature current becomes larger than the maximum value; and PLC represents a power limit circuit which provides a voltage ep only when the motor output passes a predetermined power limit $P_L$ and which circuit is related to this invention.

A speed command voltage ev from the input (not shown) is applied to the firing phase angle control circuit IAC through the amplifiers AMP1 and AMP2. When supplied with the input, the firing phase angle control circuit IAC fires the clockwise thyristors $S_1$ to $S_4$ and the counter clockwise thyristors $S_1'$ to $S_4'$ at appropriate timings in accordance with the commanded direction of rotation to supply a current $I_A$ to the DC motor to drive it. The revolving speed of the DC motor is detected by the tacho generator TG and a voltage ef proportional to the detected motor speed is fed back to the adder $A_1$ for comparison with the speed command voltage ev and the difference voltage ev-ef is applied to the amplifier AMP1. The firing phase angle control IAC controls the firing phase angles of the thyristors to reduce the difference voltage ev-ef to zero. In other words, the firing phase angle control circuit IAC serves to quicken or delay firing of the thyristors depending upon whether the motor speed is lower or higher than the commanded speed, by which the impressed voltage to the motor is rendered constant finally to make the motor speed coincide with the commanded speed, at which the motor is driven. Letting the commanded speed and the load torque be represented by $n_1$ and $T_1$, respectively, the motor output $P_1$ becomes $2\pi \cdot n_1 \cdot T_1$(kW).

This invention will hereinbelow be described in connection with the case where its DC motor drive system is applied to a lathe. Assume that a workpiece is being cut by a cutter while being driven by the abovesaid motor revolving at the speed $n_1$ to provide the output $P_1$. When the cutting proceeds to a harder portion of the workpiece, the torque on the cutter increases to reduce the motor speed and the tacho generator output voltage ef becomes lower. Consequently, the difference voltage ev-ef increases and the firing phase angle control circuit IAC operates to quicken firing of the thyristors to increase the voltage to the motor and hence return the motor speed to the commanded speed. On the other hand, upon reduction of the motor speed and increasing of the impressed voltage to the motor, the armature current Ia starts to increase. Since the motor output is given by the product of the counter electromotive force E and the armature current Ia, the motor output exceeds the power limit $P_L$ sooner or later.

Figure 4:
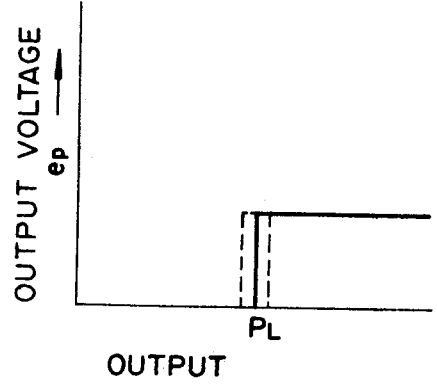
FIG. 4 is a graph showing the output characteristic of the power limit circuit.
Figure 5:
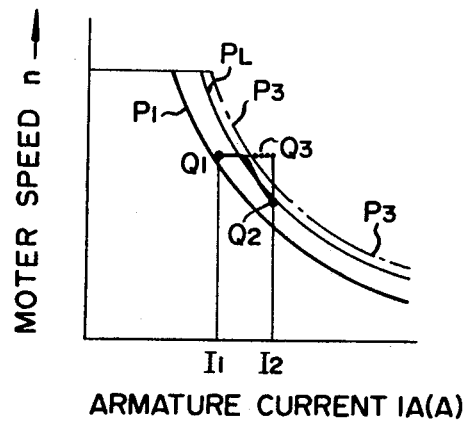
FIG. 5 is a graph explanatory of the operation of the system of this invention.

When the motor output passes the power limit $P_L$, the power limit circuit PLC immediately starts to provide the voltage ep. That is, as will be described later on, the power limit circuit PLC is supplied with the armature current Ia and the tacho generator output ef, and computes therefrom the motor output and produces such a voltage ep as shown in FIG. 4 when the motor output exceeds the power limit $P_L$. The output voltage ep is applied to the adder A3. As a result of this, the adder A3 derives therefrom an output (ev-ep)-ef to provide the state equivalent to that in which the commanded speed has been reduced, and firing of the thyristors begin to be delayed, causing a decrease in the voltage V being applied to the motor. On the other hand, the amount of the armature current Ia increases due to the reduction of the motor speed exceeds the amount of the former decreases due to the reduction of the applied voltage V, so that the armature current Ia increases. Thus, the operation point shifts from $Q_1$ to $Q_2$, as depicted in FIG. 5. That is, at the operation point $Q_2$, a torque $k\phi I_2$ is produced by the armature current $I_2$ and this torque agrees with the torque required by the cutter.

In this manner, when the motor output exceeds the power limit $P_L$, the circuit operates to reduce the motor speed, so that the time in which the motor output is in excess of the power limit $P_L$ is very short and no sparking occurs in the brush.

Especially in this invention, since the power limit $P_L$ is selected to be a little lower than the commutation limit $P_S$, the motor output does not exceeds the commutation limit $P_S$, ensuring an excellent motor drive.

In accordance with this invention, when the motor output passes the power limit $P_L$, the motor speed can no longer be made coincident with the commanded speed but, from the viewpoint of preventing breakage of the cutter, it is rather desirable to adopt such a control that the motor speed is lower than the commanded speed. The reason is that the maximum torque permitted of the cutter is determined by its material and so on. The torque actually applied to the cutter is dependent upon the depth of cut, the revolving speed and the material of the workpiece, etc. Accordingly, when cutting a hard portion of the workpiece, the revolving speed of the spindle, that is, the workpiece, is required to be reduced. If the revolving speed is always maintained constant regardless of the hardness of the workpiece, the torque on the cutter exceeds its permissible maximum torque, resulting in the breakage of the cutter. Therefore, for preventing spark generation and breakage of the cutter, it is preferred to decrease the motor speed when the motor output exceeds the power limit as cutting proceeds to a hard portion of the workpiece.

Figure 3:
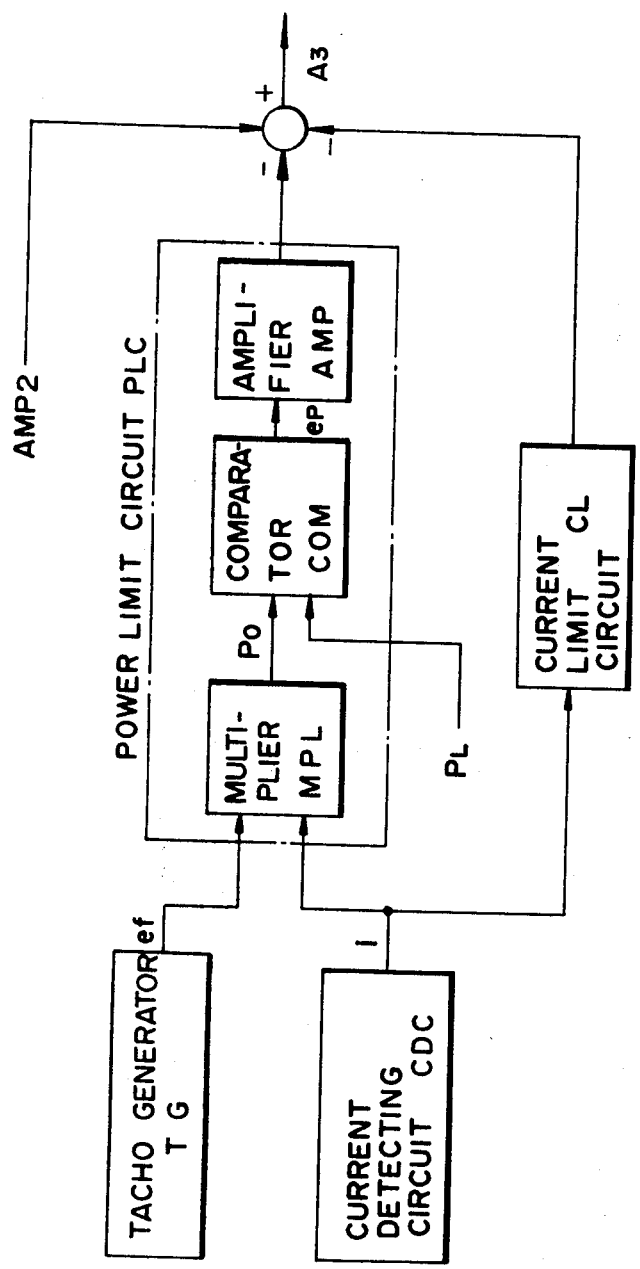
FIG. 3 is a block diagram showing a power limit circuit.

FIG. 3 shows in detail the power limit circuit PLC employed in FIG. 2. Reference character MPL indicates a multiplier; COM designates a comparator; and AMP identifies an AMP. The other reference characters represent the same parts as those in FIG. 2.

The multiplier MPL performs the multiplication of the output voltage ef from the tacho generator TG and the output i from the current detecting circuit CDC to compute the motor output.

Namely, in the DC motor, the following formulae are established:

$V = E + Ra \cdot Ia$ $P_O = E \cdot Ia$ where E is the counter electromotive force of the motor and is equal to $k\phi n$ and $P_O$ is the motor output. Therefore, it follows that $$P_O = k\phi n I a$$

The motor output $P_O$ is in proportion to the product of the revolving number n and the armature current Ia, and the motor output $P_O$ is provided as the output from the multiplier MPL. The motor output $P_O$ is compared by the comparator COM with the power limit $P_L$. When $P_O \geq P_L$, the comparator COM provides a constant voltage ep, as depicted in FIG. 4, which voltage is applied to the adder A3 through the amplifier AMP and, thereafter, the operation described above with regard to FIG. 2 is achieved.

Figure 6:
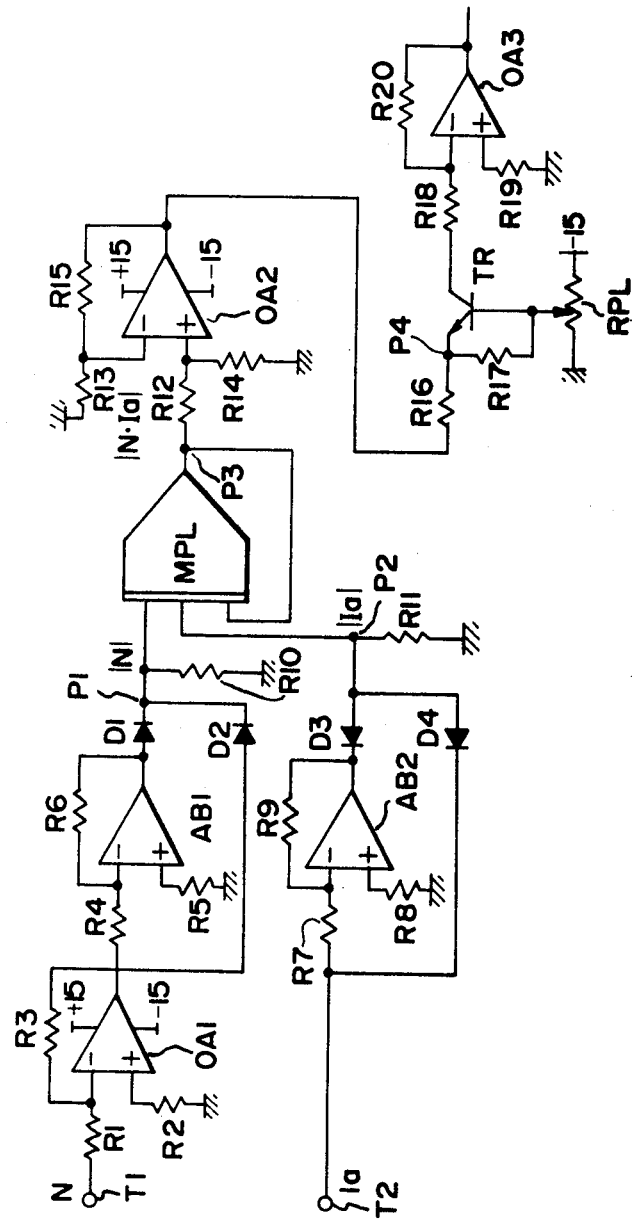
FIG. 6 is a circuit diagram illustrating the power limit circuit depicted in FIG. 3.

FIG. 6 illustrates in detail the power limit circuit shown in FIG. 3.

In FIG. 6, reference characters $T_1$ and $T_2$ indicate input terminals, to which are applied detected values of the tacho generator voltage N and the armature current Ia, respectively. Reference character $T_3$ designates an output terminal, which is connected to the output terminal of the amplifier AMP2 used in FIG. 2. When the detected power N·Ia exceeds a voltage set by a power limit setter RPL formed with a variable resistor, the voltage at the terminal $T_3$ is clamped. Reference characters $R_1$ to $R_{20}$ identify resistors; $OA_1$ to $OA_3$ denote operational amplifiers; $AB_1$ and $AB_2$ represent absolute value circuits; MPL shows a multiplier; $D_1$ to $D_4$ refer to diodes; and TR indicates a transistor.

That is, a voltage indicative of $|N|$ is provided at the output point $P_1$ of the absolute value circuit $AB_1$ and a voltage indicative of $|Ia|$ is derived at the output point $P_2$ of the absolute value $AB_2$. These voltages are multiplied in the multiplier MPL to derive at its output point $P_3$ a voltage indicative of $|N \cdot Ia|$.

The output of the multiplier MPL is inverted by the inverter circuit comprising operational amplifier OA2 and resistors R12–R15.

The output of operational amplifier OA2, (corresponding to $-|N \cdot Ia|$), is fed to the limiter circuit comprising transistor TR and resistors R16, R17 and variable resistor RPL connected to a negative voltage. By adjusting the value of resistor RPL, the most negative voltage present and the collector terminal of transistor TR can be controlled.

The output of the limiter circuit is fed to a second inverter circuit comprising operational amplifier OA3 and resistors R18–R20. Thus, the output at terminal T3 is proportional to $|N \cdot Ia|$ providing $|N \cdot Ia|$ does not exceed a predetermined value set by the power limit setter RPL. If $|N \cdot Ia|$ exceeds the predetermined value, the output at terminal T3 becomes a constant independent of $|N \cdot Ia|$.

With this invention, it is possible to prevent sparking of the brush and breakage of the cutter, achieving an optimum DC motor drive, as described in the foregoing.

Although this invention has been described above in connection with the case where the power limit output is such as shown in FIG. 4, it is a matter of course that the invention is not limited specifically thereto and that various modifications such as providing hysteresis characteristic as indicated by broken lines in FIG. 4 can be effected. Further, in the above, the motor output $P_O$ is detected and compared with the power limit $P_L$ but the same control as described above can also be achieved by using the motor input Pi.

It will be apparent that many modifications and variations may be effected without departing from the scope of the novel concepts of this invention.

What is claimed is:

1. A DC motor drive system comprising:
   (a) means for detecting the power of the DC motor, said power detecting means including means for detecting the rotational speed and armature current of the DC motor; absolute value means, connected to the means for detecting the rotational speed and armature current of the DC motor, for providing outputs proportional to the absolute values of the rotational speed and armature current of the DC motor; and means, connected to the absolute value means, for multiplying together the outputs proportional to the absolute values of the rotational speed and armature current of the DC motor and producing an output value directly proportional to the power output of the DC motor, providing that the field flux of the DC motor is constant; and
   (b) means, connected to said power detecting means, for controlling the rotational speed of the DC motor in accordance with the power output value of said power detecting means and in such a manner that said power output value of said power detecting means does not exceed a predetermined allowed power value for the DC motor.

2. A DC motor drive system according to claim 1, wherein said DC motor further comprises brushes and wherein the predetermined allowed power value is selected not to exceed a commutation limit of the motor brushes.

3. A DC motor drive system according to claim 1, wherein the DC motor is a permanent magnet-type DC motor.

4. A DC motor drive system for driving a DC motor and comprising an AC to DC voltage converter means having a plurality of thyristors, a tachometer generator means mechanically connected to said DC motor for producing a voltage signal representative of the actual speed of said DC motor, a current detecting means operatively connected to said DC motor for producing a voltage signal representative of the armature current of DC motor, a multiplier means operatively connected to the tachometer generator means and the armature current detecting means for producing an output signal representative of the product of the voltage signals from said tachometer generator means and said armature current detecting means, said output signal thereby being directly proportional to the power output of said DC motor, a comparator means operatively connected to said multiplier means for comparing the output signal from said multiplier means with a fixed voltage representative of a predetermined maximum allowed power value for said DC motor, and a speed control means operatively connected to said plurality of thyristors and to a manually controlled voltage source, said manually controlled source producing a voltage signal representative of the desired DC motor speed;
   wherein said speed control means generates an error signal representative of the difference between the desired DC motor speed and the actual DC motor speed and controls said plurality of thyristors such that the armature current of said DC motor is controlled so as to make the desired DC motor speed equal to the actual DC motor speed; and wherein said comparator means is operatively connected to said speed control means such that said error signal is limited in value by said comparator means whereby the output power of said DC motor does not exceed a predetermined maximum value.

5. The DC motor of claim 1 wherein said speed control means comprises:
(a) a plurality of thyristors;
(b) thyristor circuit means for controlling the firing phase angles of said thyristors in response to an analog error voltage signal representative of the difference between a desired DC motor speed and the actual DC motor speed; and
(c) comparator means for comparing the detected power output value of said power detecting means and a predetermined maximum power output value for the DC motor and producing a limiting voltage for the analog error voltage signal input of the thyristor control circuit when the detected power output value exceeds the predetermined power output value.

6. The DC motor of claim 5 wherein said speed control means further comprises adder means, responsive to the error voltage and power limiting voltage, for producing an input voltage to the thyristor circuit control means equivalent to that in which the desired DC motor speed has been reduced.

7. The DC motor of claim 5 or 6 wherein said comparator means provides a constant power limiting voltage for adjusting the input voltage to the thyristor circuit control means independent of the power output value produced by said multiplier means when the produced power output value exceeds the predetermined maximum allowed power output value.

* * * * *

UNITED STATES PATENT AND TRADEMARK OFFICE
CERTIFICATE OF CORRECTION

PATENT NO. : 4,268,781
DATED : May 19, 1981
INVENTOR(S) : Shigeki Kawada et al.

It is certified that error appears in the above—identified patent and that said Letters Patent is hereby corrected as shown below:

Front page, [73] Assignee:, after "Limited" insert --Tokyo,--;
Front page, [57] Abstract, line 7, "over load" should be
    --overload--.
Column 1, line 10, "magent" should be --magnet--;
Column 1, line 56, "T=k·φIa·" should be --T=k·φ·Ia--;
Column 1, line 63, "magent" should be --magnet--.
Column 3, line 2, "tacho" should be --tachometer--;
Column 3, line 3, "and" should be --to--;
Column 3, line 31, "tacho" should be --tachometer--;
Column 3, line 55, "tacho" should be --tachometer--.
Column 4, line 3, "tacho" should be --tachometer--;
Column 4, line 13, "due to" should be --because--;
Column 4, line 15, after "creases" insert --(in motor speed)--;
    delete ", so";
Column 4, line 16, delete "that the armature current Ia
    increases--;
Column 4, line 29, "exceeds" should be --exceed--;
Column 4, line 59, "tacho" should be --tachometer--;
Column 4, line 60, "i" should be --$\underline{i}$--.

UNITED STATES PATENT AND TRADEMARK OFFICE
CERTIFICATE OF CORRECTION

PATENT NO. : 4,268,781

DATED : May 19, 1981

Page 2 of 2

INVENTOR(S) : Shigeki Kawada et al.

It is certified that error appears in the above—identified patent and that said Letters Patent is hereby corrected as shown below:

```
Column 5, line  8, "n" should be --n--;
Column 5, line 21, "tacho" should be --tachometer--;
Column 5, line 41, after "OA2" delete ",";
Column 5, line 42, after ")" delete ",".
Column 6, line 17, "por-" should be --pro---.
```

Signed and Sealed this

Fourteenth Day of September 1982

[SEAL]

Attest:

Attesting Officer

GERALD J. MOSSINGHOFF

Commissioner of Patents and Trademarks